(12) United States Patent
Wendt et al.

(10) Patent No.: US 12,068,867 B2
(45) Date of Patent: Aug. 20, 2024

(54) VOLTAGE-CURRENT PROFILE BASED START-UP OF PoE DEVICES

(71) Applicant: SIGNIFY HOLDING B.V., Eindhoven (NL)

(72) Inventors: Matthias Wendt, Wurselen (DE); Muhammad Mohsin Siraj, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 90 days.

(21) Appl. No.: 17/795,923

(22) PCT Filed: Feb. 8, 2021

(86) PCT No.: PCT/EP2021/052941
§ 371 (c)(1),
(2) Date: Jul. 28, 2022

(87) PCT Pub. No.: WO2021/160551
PCT Pub. Date: Aug. 19, 2021

(65) Prior Publication Data
US 2023/0104407 A1    Apr. 6, 2023

(30) Foreign Application Priority Data
Feb. 10, 2020   (EP) .................................. 20156270

(51) Int. Cl.
*H04L 12/10*    (2006.01)
*H04L 49/351*   (2022.01)

(52) U.S. Cl.
CPC ............ *H04L 12/10* (2013.01); *H04L 49/351* (2013.01)

(58) Field of Classification Search
CPC ............................... H04L 12/10; H04L 49/351
See application file for complete search history.

(56) References Cited

U.S. PATENT DOCUMENTS

| | | | |
|---|---|---|---|
| 9,377,794 B1 * | 6/2016 | Dwelley | ................. G05F 1/462 |
| 9,488,997 B1 * | 11/2016 | Dwelley | ............. H04L 41/0681 |
| 2005/0135258 A1 | 6/2005 | Amrod et al. | |
| 2006/0092000 A1 * | 5/2006 | Karam | .................... H04L 12/44 |
| | | | 713/300 |
| 2009/0235094 A1 * | 9/2009 | Diab | ...................... G06F 1/266 |
| | | | 713/300 |

(Continued)

*Primary Examiner* — Faisal M Zaman

(57) ABSTRACT

The present invention relates to fast start-up of powered devices (22) connected to a power sourcing equipment (10') in a Power over Ethernet system (100). A stored voltage-current profile of an initial powering phase of a powered device (22) is provided. A voltage level provided to the powered device (22) in a subsequent initial powering phase of the powered device (22) is adjusted as long as a value corresponding to a current voltage level of a voltage-current profile of the subsequent initial powering phase deviates less than a predetermined threshold level from its corresponding value of the stored voltage-current profile of the initial powering phase of the powered device (22) and until a predetermined voltage level is reached. This can allow detecting whether a previously connected powered device (22) was replaced by another powered device (22) and to immediately start-up an unchanged powered device (22) with previously used operation parameters.

18 Claims, 7 Drawing Sheets

(56) References Cited

U.S. PATENT DOCUMENTS

| | | | |
|---|---|---|---|
| 2012/0239209 A1* | 9/2012 | Brown | G02F 1/13318 |
| | | | 359/275 |
| 2014/0053011 A1* | 2/2014 | Diab | G06F 1/3209 |
| | | | 713/340 |
| 2018/0052504 A1* | 2/2018 | Wendt | G06F 1/24 |
| 2020/0204382 A1* | 6/2020 | Lagrange | H04L 12/40039 |

* cited by examiner

VOLTAGE-CURRENT PROFILE BASED START-UP OF PoE DEVICES

CROSS-REFERENCE TO PRIOR APPLICATIONS

This application is the U.S. National Phase application under 35 U.S.C. § 371 of International Application No. PCT/EP2021/052941, filed on Feb. 8, 2021, which claims the benefit of European Patent Application No. 20156270.9, filed on Feb. 10, 2020. These applications are hereby incorporated by reference herein.

FIELD OF THE INVENTION

The present invention relates to a power sourcing equipment (PSE), a Power over Ethernet (PoE) system, a method for supplying power to a powered device (PD), a computer program product, and a computer readable medium storing the computer program product. In particular, the invention relates to a PSE for fast start-up of PDs and supplying power to PDs in a PoE system.

BACKGROUND OF THE INVENTION

The IEEE PoE standards include IEEE Std. 802.3af, IEEE Std. 802.3at, and IEEE Std. 802.3bt. The IEEE PoE Standards describe a conventional negotiation process for start-up of PDs. The IEEE PoE Standards require PD identification and classification at any power up cycle for the PSE in order to ensure that only ports are supplied with power to which a valid PD is connected. A valid PD is to be understood as a PD with a valid PD detection signature in the sense of the IEEE PoE standards. Classification of the PD can be performed by applying different predetermined voltage levels for appropriate amount of time and measuring current levels in order to retrieve a class signature.

US 2014/0053011 A1 shows that a PoE process can be modified to enable a fast-restart powering method. The method comprises detecting a signature for a PD at a PSE that is configured to deliver power to the PD via a network cable that couples the PD to a PSE port. The method further comprises determining whether the detected signature is indicative of an unknown PD. When the determination indicates that the detected signature is indicative of an unknown PD, a classification of the PD is performed by the PSE prior to delivery of power. When the determination indicates that the detected signature is indicative of a PD that was previously known to the PSE, then the PD is powered using a classification of the PD that was determined prior to the detecting of the PD.

U.S. Pat. No. 9,377,794B1 discloses a Power Over Ethernet (PoE) system which includes Power Sourcing Equipment (PSE) providing data and voltage over Ethernet wires to a Powered Device (PD). Instead of the conventional detection and classification routine being performed every time the system is powered up, the pertinent data to determine whether to apply PoE to the PD is stored in a memory in the PSE. The memory is accessed by a controller in the PSE when the PSE is powered up. Therefore, a time-consuming detection and classification routine does not have to be performed each time the system is powered up.

SUMMARY OF THE INVENTION

It can be seen as an object of the present invention to provide a PSE, a PoE system, a method for supplying power to a PD, a computer program product, and a computer readable medium storing the computer program product which allow a faster start-up of a PD connected to a PSE.

In a first aspect of the present invention a PSE is presented. The PSE comprises a power supply, a data storage, and a controller. The power supply is configured for supplying power to a PD connected to the PSE. The data storage is configured for storing a voltage-current profile of an initial powering phase of the PD. The controller is configured for adjusting a voltage level provided to the PD in a subsequent initial powering phase of the PD as long as a value corresponding to a current voltage value of a voltage-current profile of the subsequent initial powering phase deviates less than a predetermined threshold level from its corresponding value of the stored voltage-current profile of the initial powering phase of the PD and until a predetermined voltage level is reached.

Since the controller is configured for adjusting the voltage level provided to the PD in the subsequent initial powering phase of the PD as long as the value corresponding to the current voltage value of the voltage-current profile of the subsequent initial powering phase deviates less than the predetermined threshold current level from its corresponding value of the stored voltage-current profile of the initial powering phase of the PD and until the predetermined voltage level is reached, it can be detected whether the PD has been replaced by another PD with a voltage-current profile deviating from the stored voltage-current profile. This can allow an immediate power up at a previously negotiated power level. Furthermore, time for starting up the PD after a power glitch or a power outage can be reduced as no negotiation process is required for classifying the PD in case that the PD was not replaced during the power glitch or power outage. Additionally, controller load during restart of the PD can be reduced. Furthermore, changes in the installation can be detected, e.g., when any value of the voltage-current profile of the subsequent initial powering phase deviates more than the predetermined threshold current level from its corresponding value of the stored voltage-current profile, i.e., indicating that the PD was replaced by another PD with a different voltage-current profile of the initial powering phase. The PSE can detect that a PD connected to the PSE was changed even before the PD is booted and its media access control (MAC) address is available. This may be used for example in a prioritization of starting up PDs. For example, if a plurality of PDs is connected to the PSE, the unchanged PDs can be started up faster and other PDs can be started up in a negotiation process.

The voltage-current profile includes current levels and voltage levels. The voltage-current profile can include static voltage-current relations. The voltage-current profile can furthermore be based on one or more parameters including timing of the current levels, timing of the voltage levels, and a start-up delay.

The value corresponding to a current voltage level of the voltage-current profile of the subsequent initial powering phase can be a current level. In other embodiments, the value can also for example be an effective resistance corresponding to a current voltage level. The effective resistance corresponding to the current voltage level can for example be determined based on at least one current level corresponding to a previous voltage level and the current level corresponding to the current voltage level.

The PSE can include a current monitor for measuring a current level corresponding to a current voltage level provided to the PD.

The predetermined threshold level can be a predetermined threshold current level. The predetermined threshold current level can for example be below 10%, such as 5%.

In the case that the value corresponding to the current voltage level of the voltage-current profile of the subsequent initial powering phase deviates from its corresponding value of the stored voltage-current profile of the initial powering phase of the PD with a value that is equal to the predetermined threshold level, the controller can be configured for further adjusting the voltage level. Alternatively, the controller can be configured for stopping adjusting the voltage level in this case.

The controller can be configured for adjusting the voltage level based on the voltage-current profile of the initial powering phase of the PD. This can allow providing a PSE which performs a fast start-up process which is compliant with the IEEE standards.

The predetermined voltage level can be determined based on the voltage-current profile of the initial powering phase of the PD. The predetermined voltage level can be the operational voltage level. This allows supplying power to the powered device when the predetermined voltage level is reached. Alternatively, the predetermined voltage level can for example be a threshold voltage level for start-up such as 36 V. This allows to reduce a risk that values corresponding to the current voltage levels of voltage-current profiles of subsequent initial powering phases of unchanged PDs with operation modes depending on external conditions or history, such as luminaires operating in dependence of a general brightness level, deviate more than the predetermined threshold level from its corresponding values of the stored voltage-current profiles of the initial powering phase of the PDs, even when the respective PD is unchanged. In other words, this allows for reducing a risk of incorrectly detecting a PD as changed PD. A start-up delay for powering up the PD may be taken into account for determining the predetermined voltage level. This can for example allow for determining the predetermined voltage level to be the operational voltage level even for cases in which external conditions or operating history influence the operational mode of PDs.

The PSE can be a PSE for a PoE system. PoE in this text is understood as covering all embodiments of PoE, e.g., PoE according to IEEE 802.3af standard, PoE plus according to IEEE 802.3at standard, 4 pair PoE according to IEEE 802.3bt standard or any other PoE.

The PSE can comprise one or more ports for connecting one or more PDs via one or more network cables, e.g. Ethernet cables. A network cable can also for example be an optical fibre, an electric wire or a twisted pair cable, such as a Cat 3 cable, Cat 4 cable, Cat 5 cable, Cat 5e cable, Cat 6 cable, Cat 6A cable, Cat 7 cable, Cat 7A cable, Cat 8 cable, Cat 8.1 cable, or Cat 8.2 cable. The network cable can include several pairs of cables, e.g., 2, 3, 4, or more pairs of cables. The cables can be unshielded or shielded, in particular individually, overally or individually and overally shielded. Power and data can be transmitted via the same fibre, wire, or cable of the network cable or via different fibres, wires, or cables of the network cable. In case of transmission of power via an optical fibre the power can be transmitted in the form of photons that can be received by a solar cell unit of the PD.

The PoE system can for example be a connected lighting (CL) system with PDs including luminaires. This can allow to reduce a risk of flickering luminaires during start-up after a power outage.

The power supply can be configured for supplying power to a respective PD connected to a respective port of the PSE via a respective network cable.

The controller can for example be a micro controller or a central processor. Alternatively or additionally, the controller can comprise a processor for comparing the stored voltage-current profile of the initial powering phase of the PD with the voltage-current profile of the subsequent initial powering phase of the PD. The processor can furthermore be configured for adjusting the voltage level provided to the PD in the subsequent initial powering phase of the PD as long as a value corresponding to a current voltage level of a voltage-current profile of the subsequent initial powering phase deviates less than a predetermined threshold level from its corresponding value of the stored voltage-current profile of the initial powering phase of the PD. The processor can further be configured for adjusting the voltage level until a predetermined voltage level is reached, e.g., an operational voltage level for supplying power to the PD. In other words, the processor can adjust the voltage level until the predetermined voltage level is reached and adjust the voltage level as long as the value corresponding to the current voltage level of the voltage-current profile of the subsequent initial powering phase deviates less than the predetermined threshold level from its corresponding value of the stored voltage-current profile of the initial powering phase of the PD. The processor stops adjusting the voltage level if either the predetermined voltage level is reached or if the value corresponding to the current voltage level of the voltage-current profile of the subsequent initial powering phase deviates more than the predetermined threshold level from its corresponding value of the stored voltage-current profile of the initial powering phase of the PD.

The PD can be operated by supplying power to it. The operation of the PD can be divided in different phases including the initial powering phase, a powering phase also called operating phase, and a power removal phase also called disconnecting phase. The powering phase and the power removal phase can for example be performed as described in the IEEE PoE Standards. In the powering phase the PSE monitors the current and/or power drawn and disconnects the PD in case that it exceeds a predetermined threshold limit. The PSE can also be configured for checking whether the PD becomes disconnected and for stopping power supply to the PD in case that it has been removed. The power removal phase concerns when and how the power supply is stopped.

The initial powering phase concerns how the PD connected to the PSE is started-up.

The initial powering phase includes a detection phase. The detection phase includes detecting whether the PD connected to the PSE is a valid PD. The detection phase can for example be performed as described in the IEEE PoE Standards.

Detecting whether the PD connected to the PSE is a valid PD can include determining an effective resistance at the PD and/or at the PSE. If power is to be applied by multiple pairs of lines, e.g., of the network cable, a detection process can be performed at all pair sets which are intended for supplying power. The effective resistance at the PD and/or the PSE can be determined based on current levels in dependence of voltage levels. For example, two current levels at two different voltage levels can be determined, which are preferably at least 1 V apart from each other and in the region of 2.8 V to 10 V. The determined voltage levels can be used for determining the effective resistance, e.g., using the formula $R_{\mathit{eff}} = (V_1 - V_2)/(I_1 - I_2)$, with a first current level $I_1$ in dependence of a first voltage level $V_1$ and a second current level $I_2$ in dependence of a second voltage level $V_2$. Detecting whether the PD connected to the PSE is a valid PD can furthermore include comparing the determined effective resistance with a predetermined effective resistance that indicates that the PD is valid. The predetermined effective resistance for the PD can for example be between 23.7 kΩ and 26.3 kΩ. The predetermined effective resistance for the PSE can for example be between 15 kΩ and 33 kΩ, preferably between 19 kΩ and 26.5 kΩ.

The initial powering phase can include a connection check phase. The connection check phase can for example be performed as described in the IEEE PoE Standards, such as in IEEE Std. 802.3bt. The connection check phase can be performed before, concurrently or after the detection phase. Connection check is for example performed for Type 3 and Type 4 PSEs that are 4-pair capable. The connection check can be performed for determining whether the connected PD is a single-signature PD or a dual-signature PD.

The initial powering phase can include a classification phase. The classification phase can for example be performed as described in the IEEE PoE Standards. In the classification phase a class of the PD can be determined. The classification phase can allow to determine how much power the PD wants and provide an information to the PD how much power it may draw. The classification phase can include providing classification voltage pulses for an appropriate time, for example in a voltage range between 15.5 V and 20.5 V. The classification phase can furthermore include providing mark voltage pulses for an appropriate time, for example in a voltage range between 7 V and 10 V and such that a mark current between 0.25 mA and 4 mA is drawn. The classification pulses can provide a class event and the mark pulses can provide a mark event, which allows to determine that a previous class event has concluded. One or more class events may be used to determine a class of the PD.

The initial powering phase can include an inrush phase also called start-up phase. The inrush phase can for example be performed as described in the IEEE PoE Standards. The PSE can be configured for limiting an amount of current that flows during the inrush phase. This can allow to prevent excessive inrush current to flow when the PD starts up.

The voltage-current profile of the initial powering phase of the PD can for example include the current levels in dependence of the voltage levels of the detection phase such that it can be determined whether the PD is a valid PD. The voltage-current profile of the initial powering phase of the PD can for example be a linear ramp of voltage or include a linear ramp of voltage. The voltage-current profile can alternatively or additionally include current levels and voltage levels according to other phases, such as connection check phase, classification phase, and inrush phase.

Adjusting the voltage level can include increasing the voltage level, decreasing the voltage level, and leaving the voltage level constant. The voltage level can be continuously adjusted. This allows to provide current levels for every voltage level and to provide a whole resulting voltage-current profile.

Alternatively or additionally, the voltage level can be adjusted discontinuously, i.e., to different discrete voltage levels. For example, discrete threshold voltage levels can be used for detecting whether the PD is a valid PD and for classifying the PD. The threshold voltage levels and corresponding current levels can for example be stored in the voltage-current profile.

Alternatively or additionally, different effective resistances can be stored in the voltage-current profile depending for example on different gradients between threshold voltage levels.

The controller can be configured for increasing the voltage level linearly. The voltage level can for example be increased using a linear ramp. The voltage level can also for example be increased using an exponential ramp or any other ramp with changing gradient dU/dt. This can allow a faster start-up of the PD, e.g., after a power outage.

The controller can for example be configured for increasing the voltage level based on the voltage-current profile of the initial powering phase of the PD. The voltage-current profile can for example include current levels and voltage levels for the detection phase and classification phase. The controller can be configured for increasing, e.g., linearly increasing, the voltage-level after a specific classification pulse, e.g., the first classification pulse.

The voltage-current profile can include a unique signature for the PD. The unique signature can be a specific effective resistance during the detection phase or a specific predefined signal in response to a specific voltage level provided by the PSE. This can allow a PD to provide a specific predefined signal that allows to identify that the PD is from a specific manufacturer and/or to handle the PD in a specific manner. The unique signature can serve as a fingerprint of the PD. The controller can be configured for providing the specific voltage level which can cause the PD to provide the unique signature, such as the specific effective resistance or the specific predefined signal in response. This can allow the PSE to identify and classify the PD based on providing a specific voltage level and receiving a corresponding or matching unique signature in response. The PSE can supply power to the PD at an operational voltage level. In case that no unique signature is received, the PSE can start a negotiation process for identifying and classifying the PD. The negotiation process can for example be a negotiation process performed for example as described in the IEEE PoE standards.

The controller can be configured for linearly increasing the voltage level provided to the PD such that the predetermined voltage level is reached within 0.1 s to 0.5 s. This allows a fast start-up of the PD. Preferably the controller is configured for increasing the voltage level provided to the PD such that the operational voltage level of the PD is reached in less than 0.5 s.

The controller can be configured for performing a negotiation process when any value of the voltage-current profile of the subsequent initial powering phase deviates more than the predetermined threshold level from its corresponding value of the stored voltage-current profile of the initial powering phase of the PD. The negotiation process can include the steps:

detecting whether the PD connected to the PSE is a valid PD,
classifying the PD into a class if the PD is a valid PD, and
causing the PSE to provide power to the PD based on the class of the PD. This allows to ensure that the PD can be supplied with power when a fast start-up of the PD is not possible. The negotiation process can be the conventional negotiation process as performed in the IEEE PoE standards, i.e., the negotiation process for identifying, classifying and inrushing a PD in a PoE system.

When any value of the voltage-current profile deviates more than the predetermined threshold current level from its corresponding value of the stored voltage-current profile of the initial powering phase of the PD, the voltage level is reset and supply of power from the PSE to the PD is stopped. Instead, the negotiation process is performed in order to determine a class for the PD and a corresponding power level required for operating the PD.

The PSE can be configured for recording voltage-current measurements performed during the negotiation process. The voltage-current measurements can for example include one or more detection current levels for one or more detection voltage levels and one or more classification current levels for one or more classification voltage levels.

The PSE can be configured for recording the voltage-current profile of the initial powering phase of the PD while adjusting the voltage level provided to the PD until a predetermined voltage level for the class of the PD is reached. The PSE can furthermore be configured for storing the voltage-current profile of the initial powering phase of the PD in the data storage. This allows to ensure that a voltage-current profile of the initial powering phase is available for the PD connected to the PSE. The predetermined voltage level for the class of the PD can be determined based on the class of the PD. The predetermined voltage level for the class of the PD can for example be the operational voltage level for the class of the PD.

The PSE can be configured for comparing the voltage-current measurements performed during the negotiation process with its corresponding values of the recorded voltage-current profile of the initial powering phase. This allows to check whether the PD has been replaced. The PSE can be configured for performing a negotiation process if the voltage-current measurements deviate more than the predetermined threshold level from its corresponding values of the recorded voltage-current profile of the initial powering phase. This allows to classify the PD in a subsequent negotiation process in case that the PD has been changed after the previous negotiation process and before recording the voltage-current profile of the initial powering phase.

Alternatively, the voltage-current profile of the initial powering phase of the PD can be pre-stored.

Alternatively or additionally, the PSE can be configured for resetting the voltage level provided to the PD as soon as an operational voltage level for providing power to the PD based on the class of the PD is reached in the negotiation process, for recording a voltage-current profile of an initial powering phase while increasing a voltage level provided to the PD up to a predetermined voltage level for the class of the PD, and for storing the voltage-current profile of the initial powering phase of the PD. This allows to ensure that the voltage-current profile is stored for the PD that was classified in the negotiation process.

The data storage can be configured for storing two or more voltage-current profiles of the initial powering phase of different PDs. Additionally or alternatively, the controller can be configured for adjusting the voltage level provided to the PD in the subsequent initial powering phase of the PD as long as the value corresponding to the current voltage level of the voltage-current profile of the subsequent initial powering phase deviates less than the predetermined threshold level from its corresponding value of one of the stored voltage-current profiles of the initial powering phase of the PDs and until the predetermined voltage level is reached.

In other words, the controller can adjust the voltage level and compare the value corresponding to the current voltage level to its corresponding value of the different voltage-current profiles stored in the data storage and if the value corresponding to the current voltage level of the voltage-current profile of the subsequent initial powering phase deviates less than the predetermined threshold level from its corresponding value in a respective one of the stored voltage-current profiles, the PD can be classified and supplied with power. This can allow a faster start-up which additionally classifies a newly connected PD based on the stored voltage-current profiles of the initial powering phase. Furthermore, a fast start-up process can be performed even when the PD connected to the PSE was changed but has been connected to the PSE before or at least a voltage-current profile of the PD is stored in the PSE. The voltage-current profiles can serve as a catalogue of PDs that have been connected to the PSE before and the PSE can use previously negotiated parameters of the PDs for operating them. The voltage-current profiles of the initial powering phase of different PDs can for example be recorded and stored based on previous recordings of the voltage-current profile in the initial powering phase of different PDs.

The stored voltage-current profiles can be exchanged between different PSEs and/or different PoE systems. This can for example allow to identify PDs that have been connected to any PSE of a PoE system or any PSE of a number of connected PoE systems.

The voltage-current profile can be associated with additional information, such as a type of the PD, a class of the PD, a power requirement of the PD, a power the PD is allowed to draw from the PSE, or any other additional information. Additional information can for example be provided between the PSE and PD based on link layer discovery protocol (LLDP). This can allow to reduce autoclass and LLDP processes when powering the PD. The data storage of the PSE can serve as local memory such that LLDP processes have only to be performed once. For example, a PD can start-up with 30 W provided by the PSE. Due to LLDP exchange, this power budget may be increased to 60 W, e.g., by adjusting the operational voltage level for the PD. Since this information can be stored, no LLDP exchange is required when restarting the PD, e.g., after a power outage. This can allow to avoid stepwise start-up of the PD.

The PSE can comprise a comparator for comparing the value corresponding to the current voltage level of the voltage-current profile of the subsequent initial powering phase to its corresponding value of the stored voltage-current profile of the initial powering phase of the PD and for providing a result of the comparison to the controller. This allows to easily compare the voltage-current profile of the subsequent initial powering phase to the stored voltage-current profile of the initial powering phase of the PD. The result of the comparison can for example be whether the value corresponding to the current voltage level of the voltage-current profile of the subsequent initial powering phase deviates less than the predetermined threshold level from its corresponding value of the stored voltage-current profile of the initial powering phase of the PD.

The comparator can for example be a window comparator. The window comparator can be configured for comparing a current level corresponding to the current voltage level of the voltage-current profile of the subsequent initial powering phase with its corresponding current level of the stored voltage-current profile of the initial powering phase of the PD, i.e., comparing a current level for a respective voltage level of the voltage current-profile of the subsequent initial powering phase with its corresponding current level of the stored voltage-current profile of the initial powering phase of the PD. The window comparator can furthermore be configured for providing a result of the comparison to the controller. The result of the comparison can for example be whether the current level of the voltage-current profile of the subsequent initial powering phase deviates less than the predetermined threshold current level from the current level of the stored voltage-current profile of the initial powering phase of the PD for the respective voltage level.

The comparator can be an analog circuit. The PSE can comprise a digital-to-analog converter (DAC) for converting values, e.g., current levels, corresponding to current voltage levels of the stored voltage-current profile of the initial powering phase of the PD from digital to analog format.

Alternatively, the comparator can be a digital circuit and the PSE can comprise an analog-to-digital converter (ADC) for converting its corresponding values, e.g., current levels measured by the current monitor, from an analog to a digital format. The comparator can be included in the controller.

The PSE can comprise two or more ports for connecting PDs via network cables. The data storage can be configured for storing a voltage-current profile of an initial powering phase of a PD for each port. The controller can be configured for adjusting a voltage level provided to the PD at each port in a subsequent initial powering phase of the PD as long as a value corresponding to a current voltage level of a voltage-current profile of the subsequent initial powering phase deviates less than a predetermined threshold level from its corresponding value of the stored voltage-current profile of the initial powering phase of the PD at a respective port and until a predetermined voltage level is reached at the respective port. This allows to perform a faster start-up of the PDs without a sequential start-up process. The start-up process can be performed in parallel for the PDs. This can allow a more reliable operation of the PDs as down time after power outage can be reduced. Furthermore, if PDs include luminaires, a flickering of the luminaires can be mitigated. This can allow a more reliable light operation.

The PSE can comprise a current monitor for each port. The data storage can store and/or be configured for storing two or more voltage-current profiles of the initial powering phase of different PDs for each port.

The controller can be configured for adjusting the voltage level provided to the PDs at two or more ports in parallel. This allows faster start-up as a plurality of PDs connected to different ports can be started up in parallel.

The controller can be configured for adjusting, e.g., increasing, the voltage level provided to the PDs at all ports in parallel. The controller can also be configured for adjusting, e.g., increasing the voltage level provided to the PDs at two or more ports, such as all ports, synchronously. This allows for faster start-up of the PDs, for example after a power outage.

The power supply can be configured for providing the voltage level. The PSE can be configured for providing the voltage level to the ports. In other words, the power supply can be configured for providing the same voltage level to two or more, such as all ports. The PSE can be configured for providing the voltage level to the ports sequentially or synchronously. This allows providing the same voltage level to all ports sequentially or synchronously. In case that the voltage level is provided to all ports synchronously, a faster start-up can be achieved.

The PSE can include one or more switches. A switch can be associated to a port, such that a switch position of the switch associated to a respective port determines whether the port is provided with the voltage level or not. The PSE can comprise a switch for each port. This allows for a cost efficient and easy structure of the PSE.

The PSE can be configured for providing the voltage level only to ports for which the value corresponding to the current voltage level of the voltage-current profile of the subsequent initial powering phase deviates less than the predetermined threshold level from its corresponding value of the stored voltage-current profile of the initial powering phase of the PD at the respective port. This allows for starting up unchanged PDs using a fast start-up process, while changed PDs can be started up using the negotiation process.

The PSE can comprise switches for disconnecting the ports from the power supply for which the value corresponding to the current voltage level of the voltage-current profile of the subsequent initial powering phase deviates more than the predetermined threshold current level from its corresponding value of the stored voltage-current profile of the initial powering phase of the PD. This allows to easily stop supply of power to changed PDs. Changed PDs can be detected and classified in a subsequent negotiation process. Alternatively, a plurality of voltage-current profiles of initial powering phases of different PDs can be stored in the data storage and be used in order to detect and classify the PDs.

The PSE can comprise a comparator for each of the ports for comparing the value corresponding to the current voltage level of the voltage-current profile of the subsequent initial powering phase to its corresponding value of the stored voltage-current profile of the initial powering phase of the PD at the respective port and for providing a respective result of the comparison to the controller. The comparators can for example be window comparators.

The PSE can be configured for supplying power to the PD via two or more lines of the network cable, e.g., via a pair set of lines. The data storage can be configured for storing a voltage-current profile for each line or each pair of lines of the network cable. The controller can be configured for adjusting, e.g., increasing, the voltage level provided to the PD in a subsequent initial powering phase of the PD as long as values corresponding to the current voltage levels of voltage-current profiles of the subsequent initial powering phase for each line deviate less than a predetermined threshold level from its corresponding values of the stored voltage-current profiles of the initial powering phase of the PD for each line and until a predetermined voltage level is reached. This allows improving reliability of the start-up based on the current-voltage profile.

The PSE can be configured for erasing the voltage-current profile or the voltage-current profiles, e.g., when unplug of mains is detected for a duration above a predetermined duration. The PSE can include a sensor for detecting unplug of mains, e.g., a capacitor that discharges within the predetermined duration. The PSE can for example be configured for erasing the voltage-current profile or the voltage-current profiles when the PD connected to the PSE is removed. In this case it is likely that another PD will be connected to the PSE and a negotiation process is required for classifying the new PD. The PSE can be configured for erasing the voltage-current profile or the voltage-current profiles when the PD was not connected to the PSE for a duration above a predetermined duration. A capacitor can be used for setting the predetermined duration. For example, the capacitor can be charged while the PD is supplied with power by the PSE. When the power supply is stopped, the capacitor starts discharging for the predetermined duration. If the capacitor is fully discharged before the PD is supplied with power from the PSE again, the voltage-current profile is or the voltage-current profiles are deleted, else faster start-up can be performed based on the voltage-current profile or voltage-current profiles. Alternatively or additionally, the PSE can be configured for erasing the voltage-current profile or the voltage-current profiles based on a trigger event, e.g., a mechanical trigger event, such as unmounting of the PSE or PD and/or movement like tilting or shaking of the PSE or PD.

In a further aspect of the present invention a PoE system is presented which includes a PSE according to any of the claims 1 to 11 or any embodiment of the PSE. The PoE system furthermore includes one or more PDs connected to the PSE via one or more network cables, e.g., Ethernet cables, such as Cat 6 cables. Using a PoE system with a PSE according to an embodiment of the invention can allow a hierarchical power down procedure to be applied. For example, only PSEs in occupied floors can be active while in other floors, PSEs can be completely powered down.

The PoE system can be configured for performing a prioritization for starting the PDs. For example, PDs with values corresponding to current voltage levels of voltage-current profiles in a subsequent initial powering phase of a respective PD that deviate less than a predetermined threshold level from its corresponding values of the stored voltage-current profile of the initial powering phase of the respective PD can be started up faster than other PDs. Additionally, a negotiation process can be performed for the PDs with any values of voltage-current profiles in the subsequent initial powering phase of a respective PD that deviate more than the predetermined threshold level from its corresponding value of the stored voltage-current profile of the initial powering phase of the respective PD.

The PoE system can include a remote control for controlling the PoE system. The remote control can for example include a personal computer, a server, a mobile phone, a tablet pc, or any other device that allows remote control of a PoE system.

The PSE can be configured for providing information about the PDs including the voltage-current profiles to other PoE systems and/or any other component of the PoE system, such as the remote control. This may be used for supporting a commissioning of the PDs, e.g., by finding similarities of the connected PDs. This can allow to identify the ports to which different PDs are connected and generating floor and/or building plans.

The PDs can for example include luminaires, switches, sensors, or any other PD.

In a further aspect of the present invention a method for supplying power to PDs in a PoE system is presented. The method comprises the steps:
  providing a stored voltage-current profile of an initial powering phase of a PD, and
  adjusting a voltage level provided to the PD in a subsequent initial powering phase of the PD as long as a value corresponding to a current voltage level of a voltage-current profile of the subsequent initial powering phase deviates less than a predetermined threshold level from its corresponding value of the stored voltage-current profile of the initial powering phase of the PD and until a predetermined voltage level is reached.

The method can comprise a step of performing a negotiation process when any value of the voltage-current profile of the subsequent initial powering phase deviates more than the predetermined threshold level from its corresponding value of the stored voltage-current profile of the initial powering phase of the PD. The negotiation process can comprise the steps:
  detecting whether the PD connected to the PSE is a valid PD,
  classifying the PD into a class if the PD is a valid PD, and
  causing the PSE to provide power to the PD based on the class of the PD.

The method can for example be performed using the PSE of any of the claims 1 to 11 or any embodiment of the PSE. The method can for example be performed in the PoE system of claim 12 or any embodiment of the PoE system.

In a further aspect of the present invention a computer program product for supplying power to PDs in a PoE system is presented. The computer program product comprises program code means for causing a processor to carry out the method as defined in claim 13, or any embodiment of the method, when the computer program product is run on the processor.

In a further aspect a computer readable medium having stored the computer program product of claim 14 is presented. Alternatively or additionally, the computer readable medium can have the computer program product according to any embodiment of the computer program product stored.

It shall be understood that the PSE of claim 1, the PoE system of claim 12, the method of claim 13, the computer program product of claim 14, and the computer readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
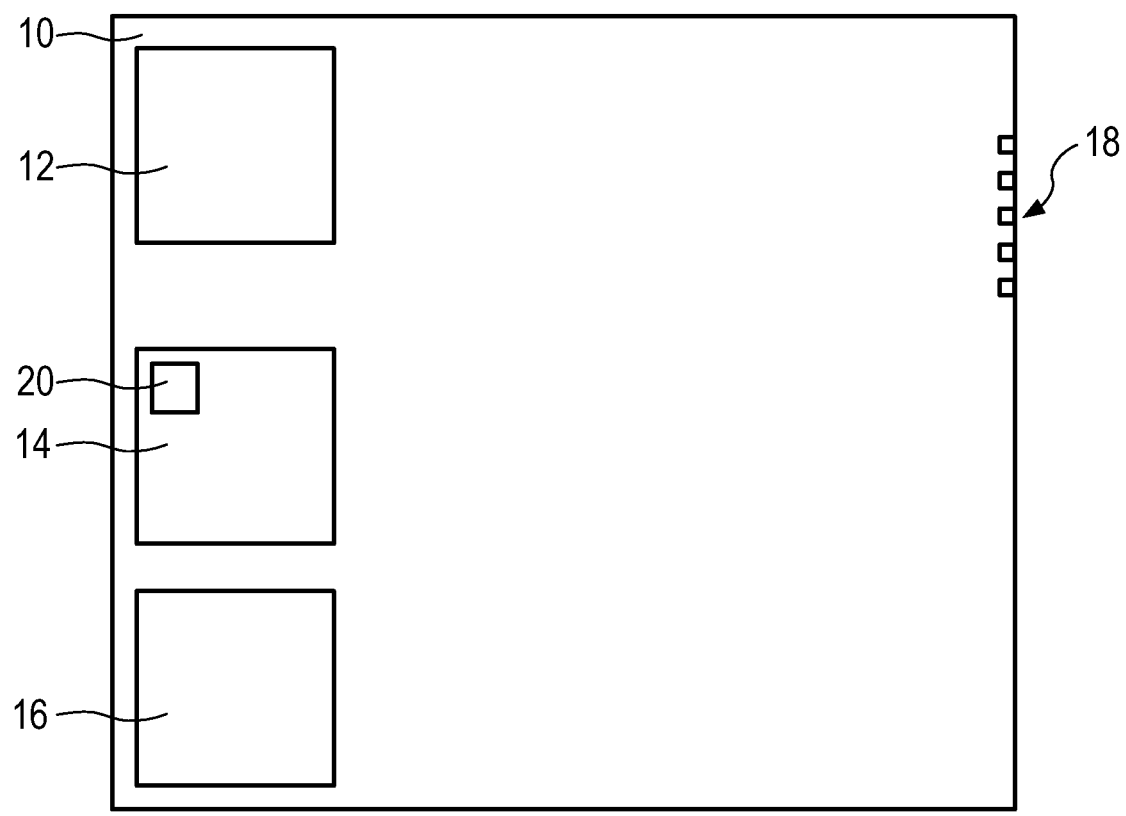
FIG. 1 shows schematically and exemplarily a first embodiment of a PSE.

FIG. 1 shows schematically and exemplarily an embodiment of a PSE 10. The PSE 10 can be used for supplying power to PDs. In order to supply power to PDs in PoE systems it has to be ensured that a PD connected to the PSE 10 is a valid PD, i.e., it has to be detected whether the connected PD is a valid PD. Furthermore, the PD has to be classified in order to determine its power requirements.

The PSE 10 allows to perform a conventional negotiation process for detecting whether the PD is a valid PD and for classifying the PD. The conventional negotiation process can be performed as described in the IEEE PoE standards, namely performing a detection phase, a classification phase, and an inrush phase. Once the conventional negotiation process has been performed, the PSE 10 can perform a faster start-up process based on a stored voltage-current profile of an initial powering phase of the PD in subsequent initial powering phases of the PD. This can be particularly useful in case of a power outage or power glitch. In this case, power supply to PDs connected to the PSE 10 is abruptly stopped. Performing a negotiation process for each of the PDs for starting them up again requires significant time. Performing a faster start-up process based on the voltage-current profiles of the initial powering phase of the PDs allows to reduce this time as previously used parameters, such as the power requirements of the PDs and the power which they are allowed to draw can be reused for unchanged PDs, i.e. PDs that have not been replaced by other PDs during the power outage. In particular, the PSE 10 can use the voltage-current profile of the initial powering phase of the PD to determine whether the PD connected to the PSE 10 has been replaced or not.

The PSE 10 includes a power supply 12, a controller in form of a micro controller 14, a computer readable medium in form of data storage 16 and ports 18.

The power supply 12 can supply power to PDs that are connected to the PSE 10. A network cable in form of an Ethernet cable can be connected to each one of the ports 18. In other embodiments, the network cable can also be any other type of network cable. The Ethernet cable can for example be a Cat 6 cable. The Ethernet cable can be connected to a PD (not shown). This allows the PSE 10 to supply power from the power supply 12 to the PD.

The data storage 16 stores a voltage-current profile of an initial powering phase of a PD that is connected to the PSE 10. The voltage-current profile of the initial powering phase of the PD is recorded in a previous initial powering phase of the PD and can be used for performing a fast start-up of the PD. In this embodiment, the voltage-current profile is generated and stored according to a negotiation process as described below for the case that fast start-up of the PD cannot be performed.

In other embodiments, the data storage can also store or be configured for storing voltage-current profiles of different PDs that can be connected to different ports of the PSE.

The data storage 16 additionally stores a computer program product for supplying power to PDs in a PoE system. The computer program product comprises program code means for causing a processor to carry out a method for supplying power to PDs in a PoE system, e.g., the method as described with respect to FIG. 6, when the computer program product is run on the processor.

The micro controller 14 includes a processor 20. The processor 20 processes data and in particular runs the computer program product stored in the data storage 14.

In this embodiment, the micro controller 14 adjusts a voltage level provided to a respective port 18 to which a PD is connected according to the voltage-current profile of the initial powering phase of the PD in a subsequent initial powering phase of the PD connected to the respective port. The micro controller 14 receives an information regarding a current level drawn via the respective port 18 by the PD and compares the drawn current level to a corresponding current level stored in the voltage-current profile of the initial powering phase of the PD. Due to measuring the current levels in dependence of the voltage levels, a voltage-current profile of the subsequent initial powering phase of the PD is generated. If the measured current level deviate less than a predetermined threshold current level from the corresponding stored current level, the micro controller keeps adjusting the voltage level according to the voltage-current profile of the initial powering phase of the PD until a predetermined voltage level is reached. If the predetermined voltage level is reached, the micro controller 14 supplies power to the PD using an operational voltage level of the PD as stored in the voltage-current profile. Reaching the predetermined voltage level indicates that the PD is unchanged and previously negotiated parameters can be used by the PSE 10 for supplying power to the PD. In this embodiment, the predetermined voltage level is the operational voltage level of the PD. Using previously negotiated parameters allows to reduce the effort in negotiating parameters, e.g., while operating the PD and exchanging requests using LLDP. In this embodiment, the predetermined threshold current level is 5%. In other embodiments, the predetermined threshold level can for example be another value below 10%. In other embodiments, the predetermined voltage level can for example be 36 V or any other reasonable voltage level.

In yet other embodiments, the PD can be detected to be unchanged when the current levels in dependence of the voltage levels of the detection phase and a first voltage pulse of the classification phase are within the predetermined threshold current level.

In other embodiments, the voltage level can be exponentially increased such that the predetermined voltage level is reached within 0.1 s to 0.5 s for a fast start-up of the PD after the PD is detected to be unchanged. As the increase of the voltage level is performed only after it has been detected that the PD is unchanged, a risk of providing excessive current is mitigated.

In other embodiments, the micro controller can be configured for linearly increasing the voltage level provided to the PD such that the predetermined voltage level is reached within 0.1 s to 0.5 s. This allows to avoid the risk of providing excessive current to the PD in a too short time.

In other embodiments, the controller can also be configured for adjusting a voltage level provided to the PD in a subsequent initial powering phase of the PD as long as a value corresponding to a current voltage level of a voltage-current profile of the subsequent initial powering phase deviates less than a predetermined threshold level from its corresponding value of the stored voltage-current profile of the initial powering phase of the PD and until a predetermined voltage level is reached in any other manner.

In this embodiment, the micro controller 14 performs a negotiation process when the measured current level deviates more than the predetermined threshold current level from the corresponding stored current level. In this case, the PD has likely been changed and therefore the measured current level of the voltage-current profile of the subsequent initial powering phase differs from its corresponding stored current level of the voltage-current profile of the initial powering phase of the PD. Performing the negotiation process allows to detect and classify changed PDs, i.e., PDs that have not been detected and classified in the previous initial powering phase. In other embodiments, the controller can also be configured for performing a negotiation process when any value of the voltage-current profile of the subsequent initial powering phase deviates more than the predetermined threshold level from its corresponding value of the stored voltage-current profile of the initial powering phase of the PD.

In the negotiation process it is first detected whether the PD connected to the PSE 10 is a valid PD. In this embodiment, two different voltage levels are provided and an effective resistance is determined based on the two different current levels for the two different voltage levels. The effective resistance is compared to a valid effective resistance range stored in the data storage 16 in order to determine whether the PD is valid. The two voltage pulses are within a voltage range of 2.8 V and 10 V and are at least 1 V apart. Furthermore, the PSE 10 is limited to voltage levels below 30 V and currents below 5 mA during the detection phase. The PD is valid, if the effective resistance is between 23.7 kΩ and 26.3 kΩ over the entire PD detection voltage range, a voltage offset is below 1.9 V, an input capacitance is between 50 nF and 120 nF, and an input series inductance is less than 100 µH. A voltage offset means that the resistive slope can be shifted by up to 1.9 V. If the PD is a valid PD, a classification phase is performed for classifying the PD into a class. In other embodiments, the detection whether the PD is a valid PD can be performed in any other manner which is compliant with the IEEE PoE standards.

In this embodiment, physical layer classification is performed after detection, before operating voltage is supplied, i.e., before operational voltage level is provided. The classification includes a series of class events in each of which a voltage pulse with a predetermined voltage level is provided to the PD which responds with a predetermined current draw. The PSE 10 applies a voltage level within a voltage range between 15.5 V and 20.5 V in order to generate a class event. A class event is followed by a mark event in which a voltage pulse with a voltage level within a range of 7 V and 10 V is provided from the PSE 10 to the PD. The mark event allows to recognize that the class event has concluded. The PDs current drawn during an individual class event is named the class signature. Class signatures are defined as integers between 0 and 4 with each representing a predetermined range of current draw during a class event. In this embodiment the classes, class events, mark events, and class signatures, as presented in the standard IEEE 802.3bt are used. The class is assigned based on the class signatures, and number of class events. This determines a power requirement of the PD. In other embodiments, the classification of the PD into a class can be performed in any other manner which is compliant with the IEEE PoE standards.

The PSE 10 is then caused to provide power to the PD based on the class of the PD. Depending on the resources available to the PSE 10, the PD can be provided with the power according to its power requirement or inform the PD about the power which it may draw and provide that amount of power, if the PSE 10 cannot provide power according to the PDs power requirement.

In this embodiment, an inrush phase is performed for providing power to the PD based on the class of the PD. Inrush is the controlled application of power for switching from a non-powered to a powered state of the PD. In this embodiment, the inrush phase is performed compliant to the standard IEEE 802.3bt. In other embodiments, the inrush phase can also be performed in any other manner which is compliant with the IEEE PoE standards.

The PSE 10 records the current levels and voltage levels of the negotiation process as voltage-current profile of the initial powering phase of the PD while the voltage level provided to the PD is adjusted until the predetermined voltage level for the class of the PD is reached. The voltage-current profile of the initial powering phase of the PD is then stored in the data storage 16. This allows using the voltage-current profile in a subsequent initial powering phase for performing a faster start-up of the PD. In particular, the voltage-current profile can be used as a signature or fingerprint of the PD which was connected to the PSE and detect whether it has been replaced or not. In case that the PD is unchanged the fast start-up process can be performed and previously negotiated parameters can be reused. In other embodiments, the data storage can be configured for storing two or more voltage-current profiles of the initial powering phase of different PDs. The controller can be configured for adjusting the voltage level provided to the PD in the subsequent initial powering phase of the PD as long as a value corresponding to a current voltage level of a voltage-current profile of the subsequent initial powering phase deviates less than the predetermined threshold level from its corresponding value of one of the stored voltage-current profiles of the initial powering phase of the PDs and until the predetermined voltage level is reached.

Figure 2:
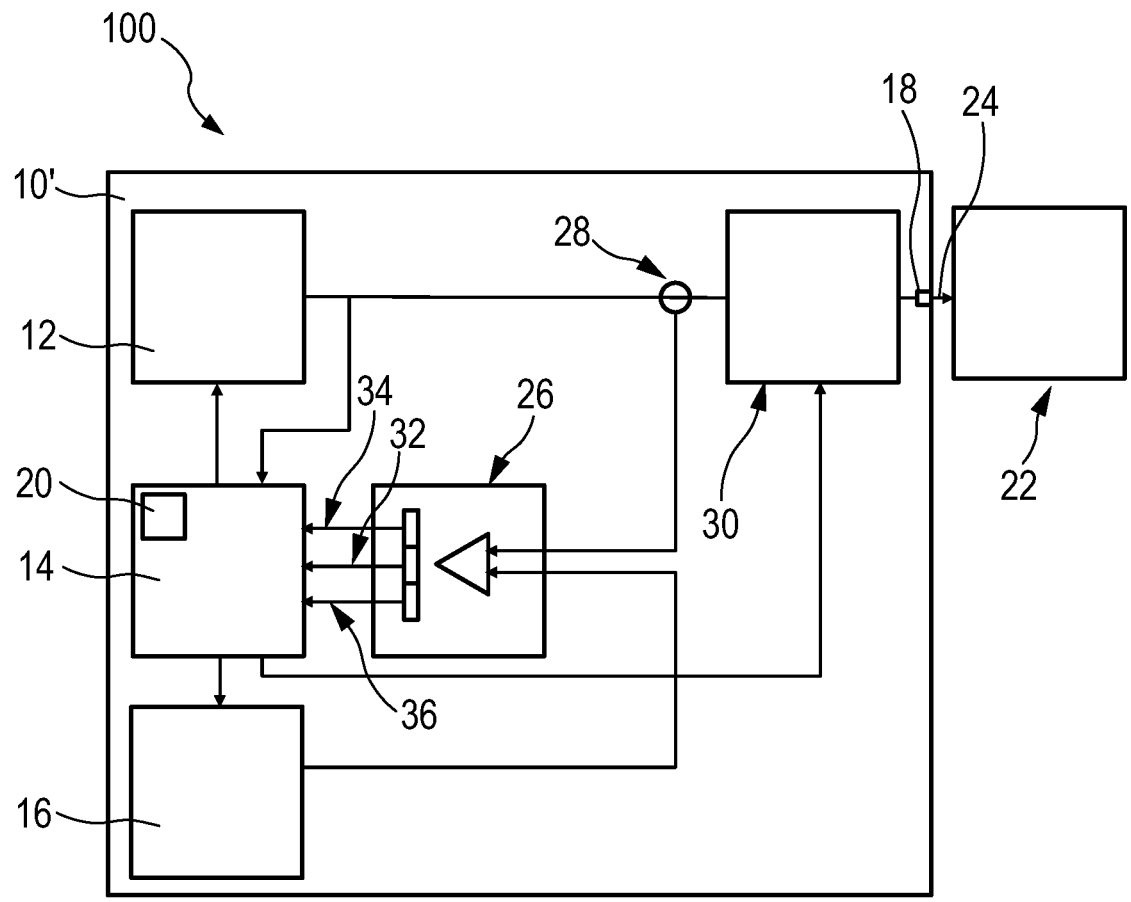
FIG. 2 shows schematically and exemplarily a first embodiment of a PoE system including a second embodiment of a PSE and a PD.

FIG. 2 shows schematically and exemplarily a first embodiment of a PoE system 100 including a second embodiment of a PSE 10' and a PD 22. In this embodiment PD 22 is a luminaire. In other embodiments, the PD can also be a heating device, a cooling device, a sensor device, a switching device, or any other type of PD. The PD 22 is connected to port 18 of the PSE 10' via a network cable in form of Ethernet cable 24. In other embodiments, the network cable can also be any other type of network cable.

The PSE 10' includes power supply 12, controller in form of micro controller 14, data storage 16, comparator 26, current monitor 28, and switch 30.

The data storage 16 stores a computer program product for operating the PSE 10' and a voltage-current profile of an initial powering phase of the PD 22. The voltage-current profile of the initial powering phase of the PD 22 was recorded in a previously performed initial powering phase of the PD 22. In other embodiments, the voltage-current profile of the initial powering phase of the PD can also be pre-stored, e.g., provided from another PSE, PoE system, or building management system (BMS).

Micro controller 14 acts as a central micro controller of the PSE 10'. The micro controller 14 includes a processor 20 which starts up quickly and which processes data, such as current levels, voltage levels, voltage-current profiles, or any other data provided to and/or controlled by the micro controller 14. The micro controller 14 sets the voltage level which is provided by the power supply 12 and which is switched through to the PD 22 by means of switch 30. In other embodiments, a plurality of controllers can be included in the PSE for controlling different functions of the PSE, e.g., causing multiple power supplies to provide different voltage levels to different ports.

A current level drawn by the PD 22 in response to the voltage level provided by the PSE 10' is measured by the current monitor 28. In contrast to conventional PSEs that perform conventional PoE negotiation processes, the micro controller 14 causes the power supply 12 to provide continuously adjusted voltage levels, such that an entire voltage-current profile with a current level for each voltage level can be provided. The current monitor 28 provides the current level to the comparator 26.

The comparator 26 is a window comparator that compares the current level provided by the current monitor 28 with a corresponding current level of the stored voltage-current profile of the initial powering phase of the PD 22 and provides a result of the comparison to the micro controller 14. The current level provided by the current monitor 28 forms a voltage-current profile of the subsequent initial powering phase. The micro controller 14 receives as result of the comparison one of three signals, namely as signal via line 32 that the measured current level deviates less than a predetermined threshold current level, e.g. 5% of the corresponding stored current level, from the corresponding current level stored in the voltage-current profile of the initial powering phase of the PD 22 or a signal via line 34 that the measured current level is higher or a signal via line 36 that the measured current level is lower than an acceptable current level determined as the corresponding current level stored in the voltage-current profile plus or minus the predetermined threshold current level.

As long as the measured current level deviates less than the predetermined threshold current level from the corresponding current level stored in the voltage-current profile of the initial powering phase of the PD 22, the voltage level is linearly increased by the micro controller 14. In case that the measured current level deviates more than the predetermined threshold current level from the corresponding current level stored in the voltage-current profile of the initial powering phase of the PD 22, the micro controller 14 causes the switch 30 to switch and thus to deactivate the power supply to the port 18. In this embodiment, the switch 30 is only switched, when the measured current level deviates more than the predetermined threshold current level from the corresponding current level stored in the voltage-current profile of the initial power phase of the PD 22 and keeps on adjusting the voltage level in cases in which the measured current level is equal to the acceptable current level determined as the corresponding current level stored in the voltage-current profile plus or minus the predetermined threshold current level.

In this embodiment, the comparator 26 includes a DAC for converting a digital format of the current level of the stored voltage-current profile into an analog format. The current monitor 28 provides the current level in an analog format to the comparator 26. In other embodiments, the PSE can also include one or more ADCs or DACs for converting signals in analog format to digital format or vice versa. The comparator can include an ADC for converting a measured current level in analog format into a digital format for comparing it to the corresponding current level from the stored voltage-current profile of the initial powering phase of the PD. In other embodiments, the comparison of the value corresponding to the current voltage level of the voltage-current profile of the subsequent initial powering phase of the PD and its corresponding value of the voltage-current profile of the initial powering phase of the PD can also be performed by the controller.

In the following the start-up process for the PD 22 performed by the second embodiment of the PSE 10' is described.

The micro controller 14 of the PSE 10' causes the power supply 12 to linearly increase the voltage level provided to the PD 22. Furthermore, the micro controller 14 causes the data storage 16 to provide the current level of the stored voltage-current profile for the voltage level currently provided to the PD 22 to the comparator 26. The current drawn by the PD 22 is measured by the current monitor 28 and a corresponding current level is provided to comparator 26 which transforms it from analog format to digital format via the ADC. The comparator 26 thus receives a measured current level and a corresponding stored current level, i.e., current levels for the same voltage level. These are compared in the comparator 26. Depending on the difference between the current levels, i.e., a result of the comparison, the comparator 26 provides a signal via one of the lines 32, 34, or 36 to the micro controller 14. In other embodiments, the lines can also be replaced by a single line which provides different signals in dependence of a result of the comparison.

The micro controller 14 accordingly either causes the power supply 12 to keep increasing the voltage level further or causes the switch 30 to switch in order to stop supply of power to the PD 22. The voltage level is linearly increased until a predetermined voltage level is reached in case that the micro controller 14 does not switch the switch 30 for stopping supply of power. In this embodiment the predetermined voltage level is the operational voltage level for supplying the PD with power. While the voltage level is increased the micro controller 14 performs a detection phase in compliance with the IEEE PoE standards, i.e., by determining an effective resistance based on two different current levels for two different voltage levels. In other embodiments, the PSE may also perform one or more other phases of the negotiation process in compliance with the IEEE PoE standards.

In case that the micro controller 14 switches the switch 30 due to the result of the comparison, a negotiation process is performed for detecting and classifying the PD 22. In this embodiment, the negotiation process is performed in compliance with the IEEE PoE standards, e.g., such as described for the first embodiment of PSE 10. After the PD 22 has been detected and classified, a fast start-up process is performed by linearly increasing the voltage level from 0 V to a predetermined voltage level based on the class of the PD 22. In this embodiment, the predetermined voltage level corresponds to the operational voltage level of the PD 22. The current levels for the different voltage levels are measured by the current monitor 28 and provided to the micro controller 14 which records them as voltage-current profile of the initial powering phase of the PD 22 and stores the voltage-current profile in the data storage 16 for a subsequent fast start-up of the PD 22. This allows easily recording a fingerprint or signature for each PD.

In other embodiments, the voltage level can be adjusted in a different manner, e.g., exponentially increased and a corresponding voltage-current profile of the initial powering phase of the PD can be recorded and stored. The PSE can perform the fast start-up based on the voltage-levels of the voltage-current profile, e.g., exponentially increasing the voltage level for the fast start-up.

Figure 3:
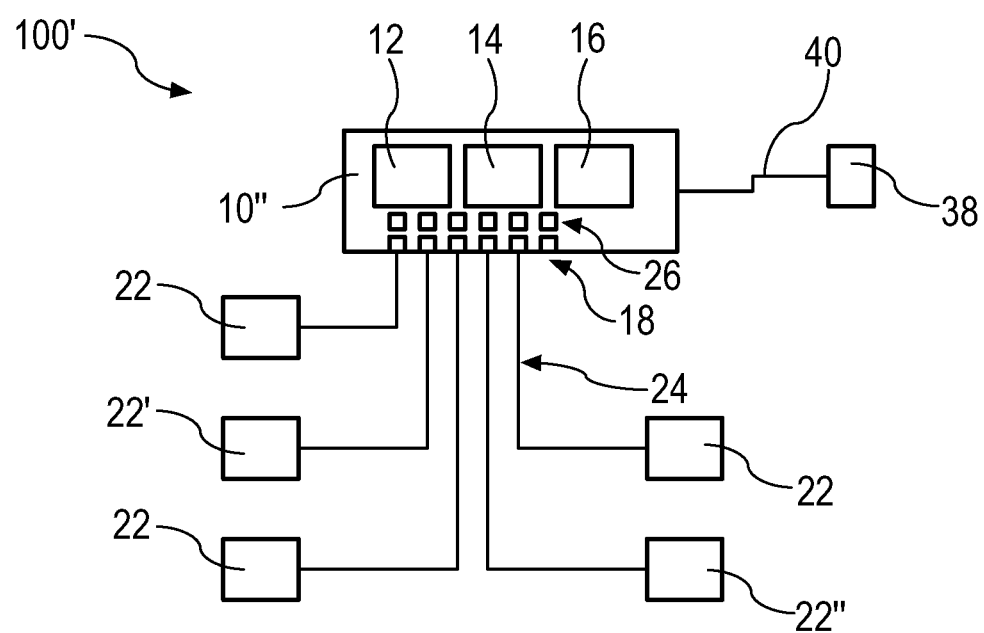
FIG. 3 shows schematically and exemplarily a second embodiment of a PoE system including a third embodiment of a PSE and a plurality of different PDs.

FIG. 3 shows schematically and exemplarily a second embodiment of a PoE system 100' with three PDs in form of luminaires 22, a PD in form of a user interface device 22', and a PD in form of a sensor device 22". In another embodiment the PoE system may also comprise a different number of PDs or other types of PDs, such as luminaires, magnet devices, actuator devices, fan devices, heating devices, or cooling devices.

The PoE system 100' furthermore comprises a PSE 10" with a power supply 12, a controller in form of micro controller 14, a data storage 16, and a plurality of ports 18 and a plurality of comparators 26. Each of the comparators 26 is associated to a respective port 18. The PSE 10" is connected to the PDs 22, 22', and 22" via network cables 24. The PSE 10" is furthermore connected to a BMS 38 via cable 40. In other embodiments, the PSE can be replaced by another embodiment of the PSE, e.g., the first or second embodiment of the PSE described with respect to FIG. 1 or FIG. 2.

The luminaires 22 can be controlled by PSE 10" based on control signals and power supply provided to the luminaires 22 via the network cables 24. The user interface device 22' includes a switch for activating or deactivating the luminaires 22. Activating or deactivating the switch causes the user interface device 22' to send a corresponding activation or deactivation signal to the PSE 10" which activates or deactivates the luminaires 22 accordingly by sending corresponding activation or deactivation signals to the luminaires 22. The sensor device 22" includes an occupancy sensor for detecting whether a person is present in the room in which the sensor device 22' is arranged and provides a respective signal to the PSE 10". The PSE 10" can process signals received from the PDs 22, 22', and 22" and provide them to the BMS 38. The BMS 38 can control the PSE 10".

The power supply 12 supplies the PDs 22, 22', and 22" with power. The power is supplied to the PDs 22, 22', and 22" via the ports 18 and the network cables 24.

The data storage 16 stores a plurality of voltage-current profiles of a respective initial powering phase of a respective PD 22, 22', and 22". A voltage-current profile is assigned to each of the ports 18, i.e., a respective voltage-current profile is assigned to a respective port 18 depending on which PD 22, 22', and 22" is connected to the respective port 18. The voltage-current profile for a respective port 18 can be recorded in an initial powering phase of the PD 22, 22', and 22" connected to the respective port 18 and used in subsequent initial powering phases in order to determine, whether the PD 22, 22', and 22" was replaced by another PD 22, 22', and 22" or whether the PD 22, 22', and 22" is unchanged. In case that the PD 22, 22', and 22" is unchanged, a fast start-up can be performed and previously negotiated parameters, such as a power requirement of the PD 22, 22', and 22" and the power the PD 22, 22', and 22" may draw, can be used by the PSE 10" in order to supply power to the PD 22, 22', and 22".

In order to determine whether the PD 22, 22', and 22" at a respective port 18 is unchanged, the micro controller 14 adjusts a voltage level provided to the PD 22, 22', and 22" at each port 18 in a subsequent initial powering phase of the PD 22, 22', and 22". The PSE 10" can adjust the voltage level according to the fast start-up process of the first embodiment of the PSE 10 or the fast start-up process of the second embodiment PSE 10'. In this embodiment, the micro controller 14 adjusts the voltage level provided to the PDs 22, 22', and 22" at all ports 18 in parallel, such that the power supply 12 provides the same voltage level to all ports 18. In other embodiments, the controller can also be configured for providing power to a limited number of ports, e.g., two or more ports.

In this embodiment, a respective comparator 26 for each of the ports 18 compares the current level corresponding to the current voltage level of the voltage-current profile of the subsequent initial powering phase to its corresponding current level of the stored voltage-current profile of the initial powering phase of the PD 22, 22', and 22" at the respective port 18 and provides a respective result of the comparison to the micro controller 14. In order to provide the current levels corresponding to the current voltage level of the voltage-current profiles of the subsequent initial powering phase, the current at the respective port 18 is measured by a current monitor associated to the respective port 18 and measured current levels are provided to the comparators 26 (not shown).

If the current level corresponding to the current voltage level of the voltage-current profile of the subsequent initial powering phase deviates less than a predetermined threshold current level from its corresponding current level of the stored voltage-current profile of the initial powering phase of the PD 22, 22', and 22" at the respective port 18, the micro controller 14 keeps on adjusting the voltage level based on a voltage level stored in the voltage-current profile of the initial powering phase of the respective PD 22, 22', and 22". The micro controller 14 adjusts the voltage level until a predetermined voltage level for supplying power to the PD 22, 22', and 22" at the respective port 18 is reached.

If any current level corresponding to the current voltage level of a voltage-current profile of the subsequent initial powering phase deviates more than the predetermined threshold current level from its corresponding current level of the stored voltage-current profile of the initial powering phase of the PD 22, 22', and 22" at the respective port 18, the micro controller 14 causes the power supply 12 to stop supplying power to the respective port 18 and performs a negotiation process, e.g., the negotiation process as performed for the first embodiment of the PSE 10 or the second embodiment of the PSE 10' in order to detect and classify a changed PD 22, 22', and 22" at the port 18.

In this embodiment, the negotiation process is performed after the unchanged PDs 22, 22', and 22" are supplied with power, i.e., after their fast start-up. In other words, the PSE 10" provides the voltage level only to the ports 18 for which the current level corresponding to the current voltage level of the voltage-current profile of the subsequent initial powering phase deviates less than the predetermined threshold current level from its corresponding current level of the stored voltage-current profile of the initial powering phase of the PD 22, 22', and 22" at the respective port 18. If any current level of the voltage-current profile of the subsequent initial powering phase deviates more than the predetermined threshold current level from its corresponding current level of the stored voltage-current profile of the initial powering phase of the PD 22, 22', and 22" at the respective port 18, the supply of power to that port 18 is stopped, e.g., by switching a corresponding switch associated to the respective port 18 (not shown).

Figure 4A:
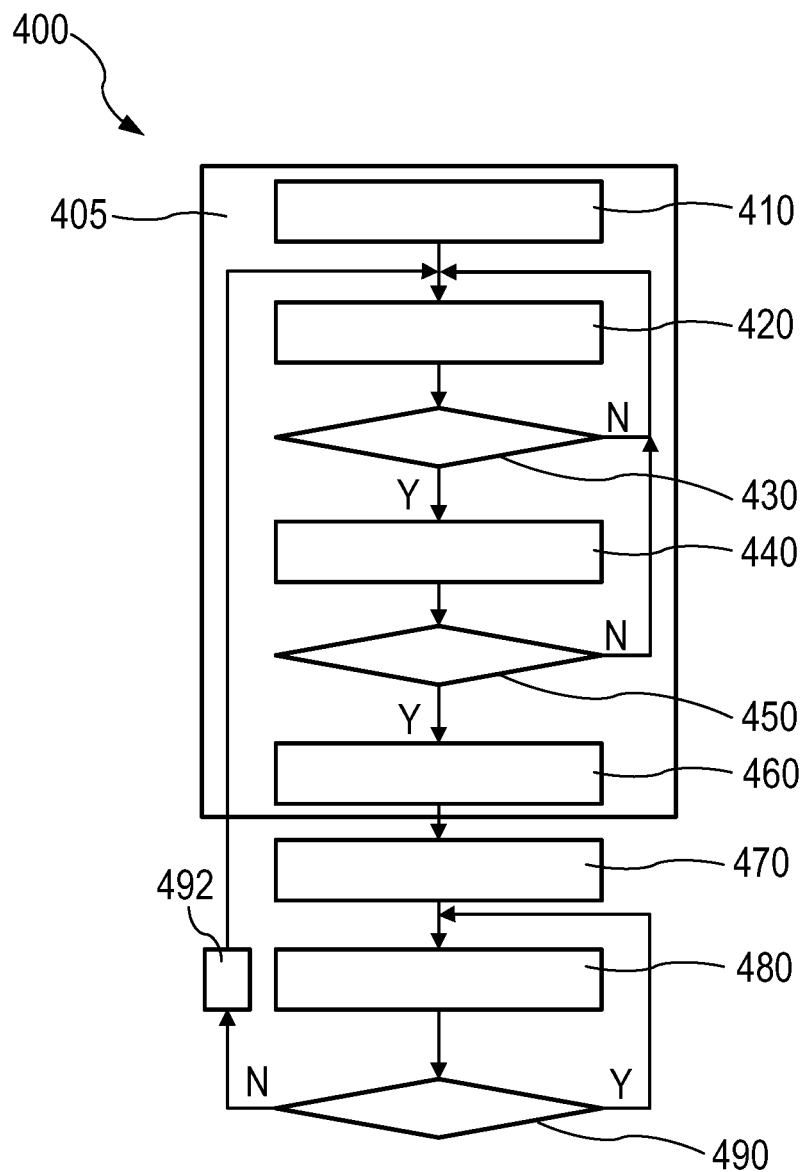
FIG. 4A shows a negotiation process during starting up a PD and a process of powering the PD.
Figure 4B:
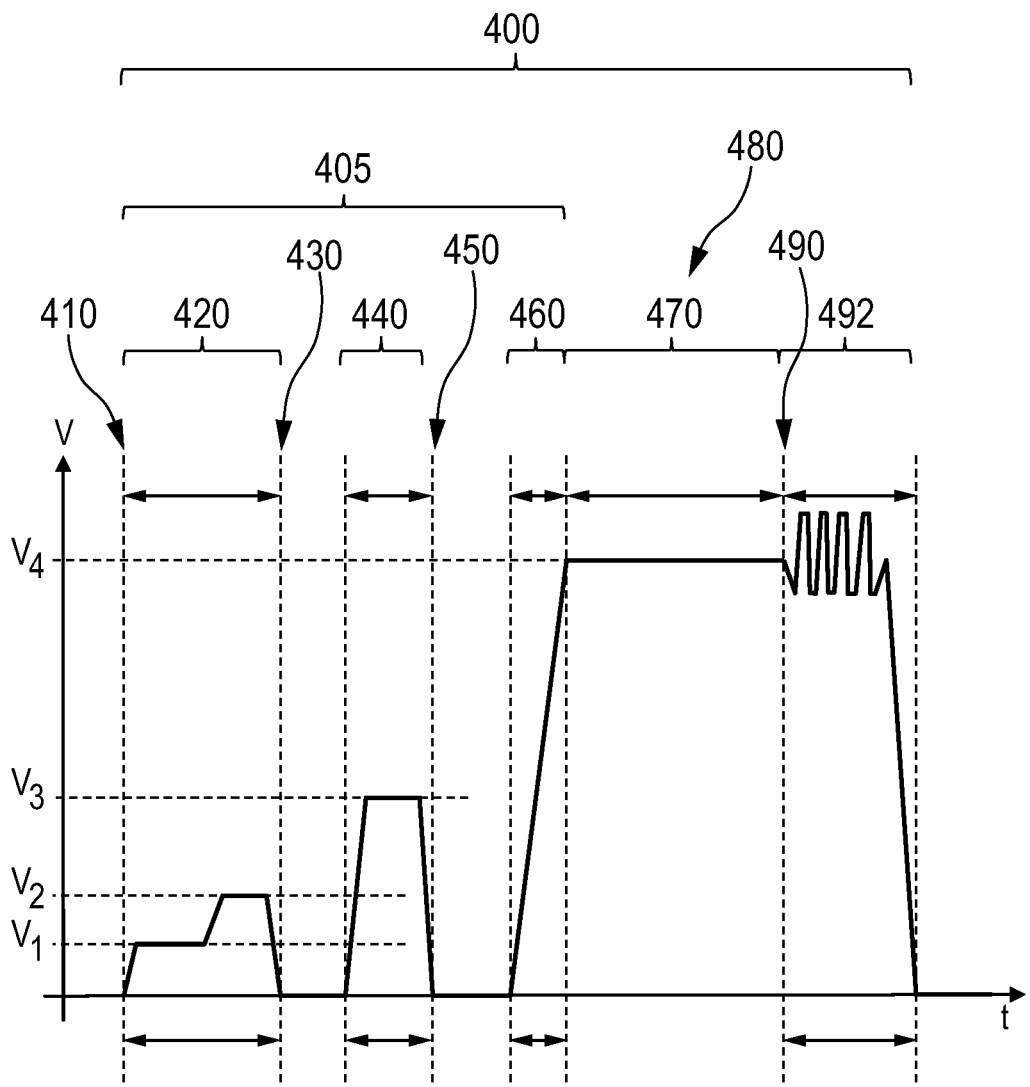
FIG. 4B shows voltage levels provided to the PD during different phases of the negotiation process and the process of powering the PD.

FIG. 4A shows a negotiation process 400 of a PD connected to a PSE including an initial powering phase 405 of the PD. The initial powering phase 405 includes a detection phase in step 420, a classification phase in step 440, and an inrush phase 460 (cf. FIG. 4B). After the initial powering phase 405, the PD is provided with power in an operating phase in step 470 and is disconnected from power in step 492. FIG. 4B shows a graph of voltage V time-dependently applied from the PSE to the PD in the different phases of the negotiation process 400.

In step 410, power supply from the PSE to the PD is activated.

In step 420, the detection phase as described in the IEEE PoE standards is performed. Based on loop current, the PSE determines if there is a PD connected. In this embodiment two current levels are determined for voltage levels between V1=2.8 V and V2=10 V. The current level and voltage levels are used to determine an effective resistance.

In step 430, it is determined whether a valid PD has been detected or not based on the effective resistance determined in step 420 and in compliance with the IEEE PoE standards. The PD is valid if the effective resistance is between 23.7 kΩ and 26.3 kΩ over the entire PD detection voltage range and has a capacitance of 120 nF or less. If no valid PD is detected, the process repeats the previous steps starting with step 420. Alternatively, the negotiation process can be stopped. If a valid PD is detected, step 440 is performed.

In step 440, the classification phase as described in the IEEE PoE standards is performed. A class of the PD is determined based on a series of class events. In this embodiment, one class event is generated with a voltage pulse with a voltage level V3 between 15.5 V and 20.5 V applied for a predetermined duration in the classification phase in step 440. Only one voltage pulse is shown here. Other voltage pulses for causing further class events and mark events are not shown for better overview.

In step 450, it is determined whether a valid PD class is found, which allows using the parameters for the class for operating the PD in compliance with the IEEE PoE standards. Therefore, the number of class events and corresponding class signatures are determined. If no valid PD class is found, the process repeats the previous steps starting with step 420. Alternatively, the negotiation process can be stopped. If a valid PD class is found, step 460 is performed in order to supply power to the PD based on the determined class.

In step 460, an inrush phase as described in the IEEE PoE standards is performed and power is supplied accordingly to the PD in order to start it up.

In step 470, the PD is supplied with power according to parameters based on the class determined for the PD. The voltage level V4 provided to the PD can for example be between 44 V and 57 V. During the operation of the PD further parameters can be negotiated, e.g., using LLDP. For example, if power requirement of the PD is higher than the PSE could originally provide, the PD may be initially operated with a lower power supply. During the operating phase, the PD may negotiate to draw higher power in order to achieve full functionality. The PSE may provide higher power supply, e.g., because other PDs require less power or other PDs were disconnected in the meantime. This can allow negotiating and adapting parameters for operating the PD during the operating phase.

In step 480, the current supplied to the PD during the operating phase is monitored.

In step 490, it is determined whether the current supplied to the PD is above the maintain power signature (MPS). If the current supplied to the PD is above the MPS, the power supply to the PD is stopped in step 492 and the previous steps starting with step 420 are repeated. If the current supplied to the PD is not above the MPS, the previous steps are repeated starting with step 480, i.e., the current supplied to the PD is continuously monitored until the MPS is detected.

Figure 5A:
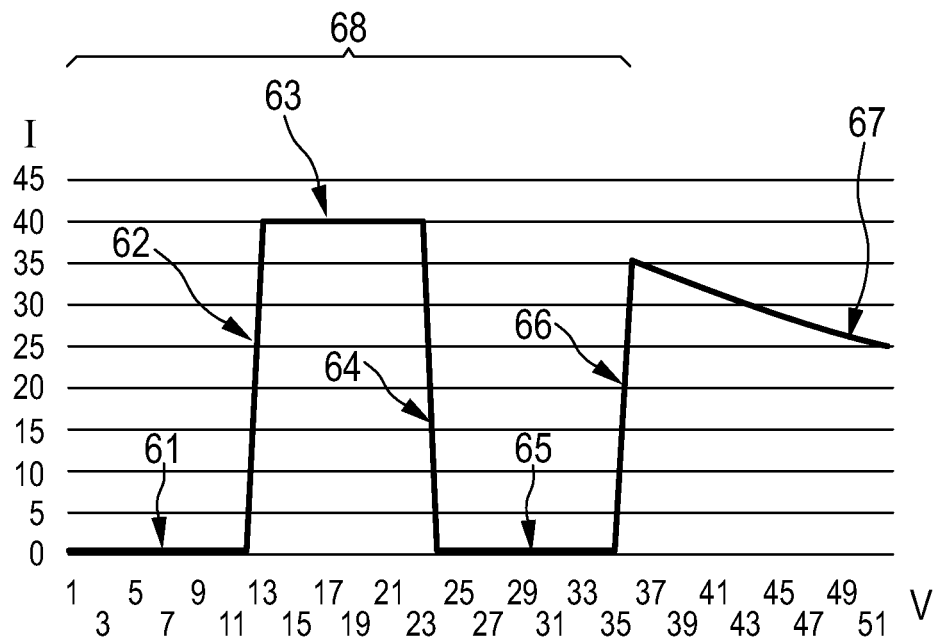
FIG. 5A shows an exemplary voltage-current profile of a PD.
Figure 5B:
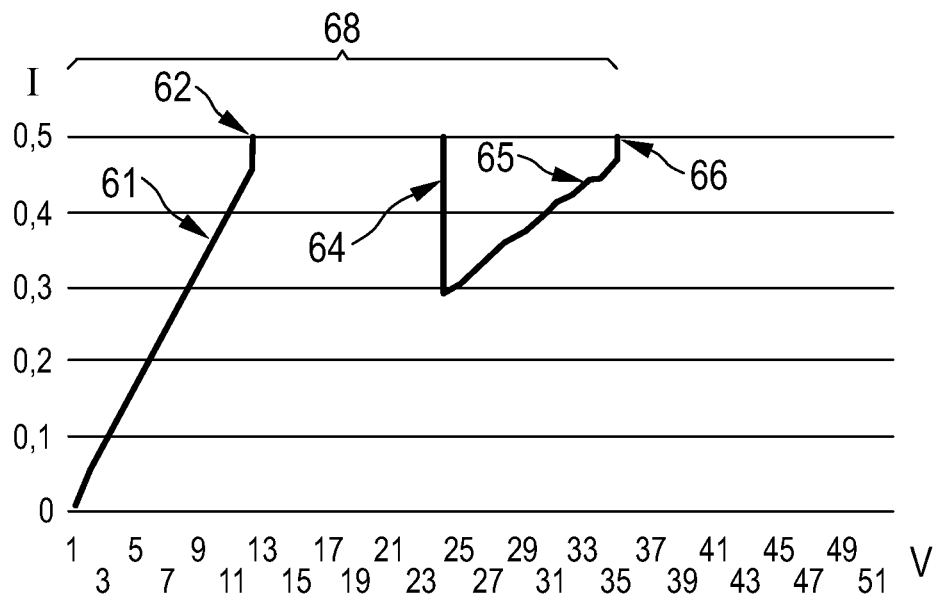
FIG. 5B shows a detail of the exemplary voltage-current profile of the PD.

FIG. 5A shows an exemplary voltage-current profile of an initial powering phase 68 and operating phase 67 of a PD connected to a PSE with current levels I in mA and voltage levels V in V. In this embodiment, the initial powering phase 68 includes a detection phase 61, a classification phase 65, and an inrush phase 66. In other embodiments, the initial powering phase 68 may also be comprised of or include other phases, e.g., the detection phase 61 and the inrush phase 66. FIG. 5B shows a detail of the exemplary voltage-current profile of the PD of FIG. 5A scaled to current levels between 0 and 0.5 mA.

Detection phase 61 relates to the detection and identification for a valid PoE PD. Current rises linearly during the detection phase 61 showing a differential resistance of 25.0 kΩ. A bending in the low voltage regime is due to a rectifier influence which generates an offset of about 0.5 V in this embodiment.

At 12.6 V the detection phase 61 ends with a current jump 62 to 39.85 mA. The current level remains constant between the voltage level range of 12.6 V to 23.7 V. This voltage range is not defined in the PoE process. In this embodiment, an internal filter capacitor is pre-charged during pre-charging phase 63.

At 23.8 V another current jump 64 starts a classification phase 65 of the PD. Current rises linearly showing a differential resistance of 60.0 kΩ in the classification phase 65.

At 35.8 V another current jump, i.e., an inrush phase 66, to 35 mA starts an operating phase 67 of the PD. From here on the current level shows a typical constant power curve with the PD consuming 1.28 W. At higher voltage levels the resulting current level is dropping. As the PD is operating in the operating phase 67, also functional current consumption, e.g., due to an activated luminaire influences the current level.

The voltage-current profile can be used for performing a fast start-up process. Therefore, the voltage-current profile may serve as a fingerprint or signature of a PD that was previously connected to the PSE. The voltage-current profile can for example be stored in a data storage of the first embodiment of the PSE 10, the second embodiment of the PSE 10', or the third embodiment of the PSE 10" in order to perform a fast start-up process.

Figure 6:
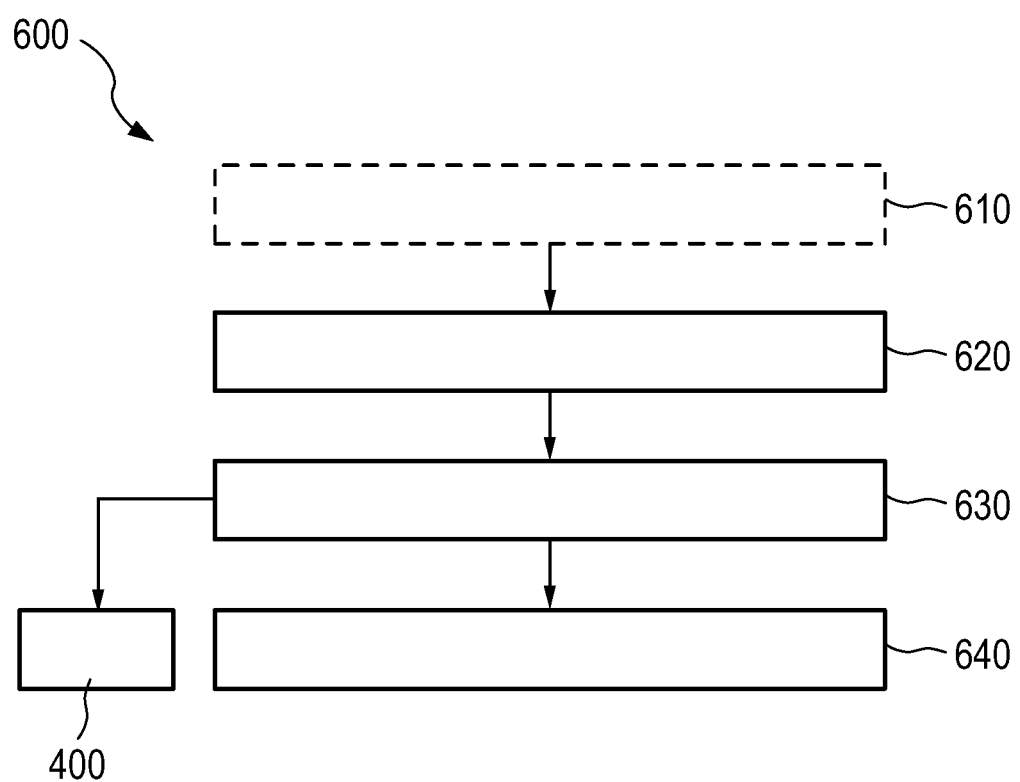
FIG. 6 shows exemplarily a flow diagram of an embodiment of a method for supplying power to a PD.

FIG. 6 shows exemplarily a flow diagram of an embodiment of a method 600 for supplying power to a PD in a PoE system. The method can be used for performing a fast start-up of the PD in the PoE system, e.g., using one of the embodiments of the PSE 10, 10', or 10" as presented with respect to FIG. 1, FIG. 2, and FIG. 3.

In step 610, a voltage-current profile of an initial powering phase of a PD is recorded and stored. Step 610 is optional. In other embodiments, the voltage-current profile of the initial powering phase of the PD can also be pre-stored.

In step 620, the stored voltage-current profile of the initial powering phase of the PD is provided. In this embodiment, the voltage-current profile is stored in a data storage and provided to a comparator for processing it.

In step 630, a voltage level provided to the PD is adjusted in a subsequent initial powering phase of the PD as long as a current level corresponding to a current voltage level of a voltage-current profile of the subsequent initial powering phase deviates less than a predetermined threshold current level from its corresponding current level of the stored voltage-current profile of the initial powering phase of the PD and until a predetermined voltage level is reached. In this embodiment the predetermined voltage level is an operational voltage level of the PD for supplying power to the PD. The predetermined threshold current level is 5% in this embodiment. In other words, the voltage level is only adjusted as long as a respective current level for each of the voltage levels of the subsequent initial powering phase does not deviate 5% or more from the respective current level as stored in the voltage-current profile of the initial powering phase of the PD. In other embodiments, the predetermined threshold current level may also have any other reasonable value, e.g., below 100%.

Step 400 is performed if any current level of the voltage-current profile of the subsequent initial powering phase deviates more than the predetermined threshold current level from its corresponding current level of the stored voltage-current profile of the initial powering phase of the PD. In this embodiment, step 400 is also performed in case that the current level of the voltage-current profile of the subsequent initial powering phase deviates exactly with the predetermined threshold current level from its corresponding current level of the stored voltage-current profile of the initial powering phase of the PD.

Step 640 is performed if the predetermined voltage level for supplying power to the PD is reached and the current level corresponding to the current voltage level of the voltage-current profile of the subsequent initial powering phase deviated less than the predetermined threshold current level from its corresponding current level of the stored voltage-current profile of the initial powering phase of the PD during the whole subsequent initial powering phase.

In step 400, the negotiation process as presented in FIG. 4 is performed. In other embodiments, any other PoE negotiation process which is compliant with the IEEE PoE standards may be performed.

In step 640, the PD is operated by supplying power according to parameters based on the voltage-current profile of the initial powering phase of the PD until the PD is eventually disconnected when a MPS is detected. Disconnecting of the PD, in this embodiment, is performed in compliance with the IEEE PoE Standards.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the PoE system is a heating ventilation air-conditioning (HVAC) system or any other BMS.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like recording and storing a voltage-current profile of an initial powering phase of a PD, providing a stored voltage-current profile of an initial powering phase of a PD, adjusting a voltage level provided to the PD in a subsequent initial powering phase of the PD as long as a value corresponding to a current voltage level of a voltage-current profile of the subsequent initial powering phase deviates less than a predetermined threshold level from its corresponding value of the stored voltage-current profile of the initial powering phase of the powered device and until a predetermined voltage level is reached, detecting whether the PD connected to the PSE is a valid PD, classifying the PD into a class if the PD is a valid PD, causing the PSE to provide power to the PD based on the class of the PD, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to fast start-up of PDs connected to a PSE in a PoE system. A stored voltage-current profile of an initial powering phase of a PD is provided. A voltage level provided to the PD in a subsequent initial powering phase of the PD is adjusted as long as a value corresponding to a current voltage level of a voltage-current profile of the subsequent initial powering phase deviates less than a predetermined threshold level from its corresponding value of the stored voltage-current profile of the initial powering phase of the PD and until a predetermined voltage level is reached. This can allow detecting whether a previously connected PD was replaced by another PD and to immediately start-up an unchanged PD with previously used operation parameters, such as supplied power.

The invention claimed is:

1. A power sourcing equipment for supplying power to powered devices in a Power over Ethernet system, wherein the power sourcing equipment comprises:
   a power supply configured for supplying power to a powered device connected to the power sourcing equipment,
   a data storage configured for storing a voltage-current profile of an initial powering phase of the powered device, wherein the voltage-current profile includes current levels and voltage levels;
   a controller configured for adjusting a voltage level provided to the powered device in a subsequent initial powering phase of the powered device as long as a value corresponding to a current voltage level of a voltage-current profile of the subsequent initial powering phase deviates less than a predetermined threshold level from its corresponding value of the stored voltage-current profile of the initial powering phase of the powered device and until a predetermined voltage level is reached,
   wherein the value corresponding to a current voltage level of the voltage-current profile of the subsequent initial powering phase is a current level; and
   a comparator for comparing the value corresponding to the current voltage level of the voltage-current profile of the subsequent initial powering phase to its corresponding value of the stored voltage-current profile of the initial powering phase of the powered device and for providing a result of the comparison to the controller.

2. The power sourcing equipment according to claim 1, wherein the controller is configured for linearly increasing the voltage level provided to the powered device such that the predetermined voltage level is reached within 0.1 s to 0.5 s.

3. The power sourcing equipment according to claim 1, wherein the controller is configured for performing a negotiation process when any value of the voltage-current profile of the subsequent initial powering phase deviates more than the predetermined threshold level from its corresponding value of the stored voltage-current profile of the initial powering phase of the powered device, the negotiation process comprises:
   detecting whether the powered device connected to the power sourcing equipment is a valid powered device,
   classifying the powered device into a class if the powered device is a valid powered device, and
   causing the power sourcing equipment to provide power to the powered device based on the class of the powered device.

4. The power sourcing equipment according to claim 3, wherein the power sourcing equipment is configured for recording the voltage-current profile of the initial powering phase of the powered device while adjusting the voltage level provided to the powered device until a predetermined voltage level for the class of the powered device is reached and for storing the voltage-current profile of the initial powering phase of the powered device in the data storage.

5. The power sourcing equipment according to claim 1, wherein the data storage is configured for storing two or more voltage-current profiles of the initial powering phase of different powered devices, and
   wherein the controller is configured for adjusting the voltage level provided to the powered device in the subsequent initial powering phase of the powered device as long as the value corresponding to the current voltage level of the voltage-current profile of the subsequent initial powering phase deviates less than the predetermined threshold level from its corresponding value of one of the stored voltage-current profiles of the initial powering phase of the powered devices and until the predetermined voltage level is reached.

6. The power sourcing equipment according to claim 1, wherein the power sourcing equipment comprises two or more ports for connecting powered devices via network cables,
   wherein the data storage is configured for storing a voltage-current profile of an initial powering phase of a powered device for each port, and
   wherein the controller is configured for adjusting a voltage level provided to the powered device at each port in a subsequent initial powering phase of the powered device as long as a value corresponding to a current voltage level of a voltage-current profile of the subsequent initial powering phase deviates less than a predetermined threshold level from its corresponding value of the stored voltage-current profile of the initial powering phase of the powered device at a respective port and until a predetermined voltage level is reached at the respective port.

7. The power sourcing equipment according to claim 6, wherein the controller is configured for adjusting the voltage level provided to the powered devices at two or more ports in parallel.

8. The power sourcing equipment according to claim 6, wherein the power supply is configured for providing the voltage level and wherein the power sourcing equipment is configured for providing the voltage level to the ports.

9. The power sourcing equipment according to claim 8, wherein the power sourcing equipment is configured for providing the voltage level only to ports for which the value corresponding to the current voltage level of the voltage-current profile of the subsequent initial powering phase deviates less than the predetermined threshold level from its corresponding value of the stored voltage-current profile of the initial powering phase of the powered device at the respective port.

10. The power sourcing equipment according to claim 6, wherein the power sourcing equipment comprises a comparator for each of the ports for comparing the value corresponding to the current voltage level of the voltage-current profile of the subsequent initial powering phase to its corresponding value of the stored voltage-current profile of the initial powering phase of the powered device at the respective port and for providing a respective result of the comparison to the controller.

11. Power over Ethernet system including:
   a power sourcing equipment according to claim 1, and
   one or more powered devices connected to the power sourcing equipment via one or more network cables.

12. A method for supplying power to powered devices in a Power over Ethernet system comprising:
   providing, via a power sourcing equipment, a stored voltage-current profile of an initial powering phase of a powered device, wherein the voltage-current profile includes current levels and voltage levels;
   adjusting, via the power sourcing equipment, a voltage level provided to the powered device in a subsequent initial powering phase of the powered device as long as a value corresponding to a current voltage level of a voltage-current profile of the subsequent initial powering phase deviates less than a predetermined threshold level from its corresponding value of the stored voltage-current profile of the initial powering phase of the powered device and until a predetermined voltage level is reached,
   wherein the value corresponding to a current voltage level of the voltage-current profile of the subsequent initial powering phase is a current level and
   comparing, via a comparator, the value corresponding to the current voltage level of the voltage-current profile of the subsequent initial powering phase to its corresponding value of the stored voltage-current profile of the initial powering phase of the powered device and for providing a result of the comparison to the controller.

13. A computer program product for supplying power to powered devices in a Power over Ethernet system, wherein the computer program product comprises instructions for causing a processor to carry out the method as defined in claim 12, when the computer program product is run on the processor.

14. A non-transitory computer readable medium having stored the computer program product of claim 13.

15. A power sourcing equipment for supplying power to powered devices in a Power over Ethernet system, wherein the power sourcing equipment comprises:
   a power supply configured for supplying power to a powered device connected to the power sourcing equipment;
   a data storage configured for storing a voltage-current profile of an initial powering phase of the powered device, wherein the voltage-current profile includes current levels and voltage levels;
   a controller configured for adjusting a voltage level provided to the powered device in a subsequent initial powering phase of the powered device as long as a value corresponding to a current voltage level of a voltage-current profile of the subsequent initial powering phase deviates less than a predetermined threshold level from its corresponding value of the stored voltage-current profile of the initial powering phase of the powered device and until a predetermined voltage level is reached;
   wherein the value corresponding to a current voltage level of the voltage-current profile of the subsequent initial powering phase is a current level;
   wherein the power sourcing equipment comprises two or more ports for connecting powered devices via network cables;
   wherein the data storage is configured for storing a voltage-current profile of an initial powering phase of a powered device for each port;
   wherein the controller is configured for adjusting a voltage level provided to the powered device at each port in a subsequent initial powering phase of the powered device as long as a value corresponding to a current voltage level of a voltage-current profile of the subsequent initial powering phase deviates less than a predetermined threshold level from its corresponding value of the stored voltage-current profile of the initial powering phase of the powered device at a respective port and until a predetermined voltage level is reached at the respective port; and wherein the power sourcing equipment comprises a comparator for each of the ports for comparing the value corresponding to the current voltage level of the voltage-current profile of the subsequent initial powering phase to its corresponding value of the stored voltage-current profile of the initial powering phase of the powered device at the respective port and for providing a respective result of the comparison to the controller.

16. The power sourcing equipment according to claim 15, wherein the controller is configured for adjusting the voltage level provided to the powered devices at two or more ports in parallel.

17. The power sourcing equipment according to claim 15, wherein the power supply is configured for providing the voltage level and wherein the power sourcing equipment is configured for providing the voltage level to the ports.

18. The power sourcing equipment according to claim 15, wherein the power sourcing equipment is configured for providing the voltage level only to ports for which the value corresponding to the current voltage level of the voltage-current profile of the subsequent initial powering phase deviates less than the predetermined threshold level from its corresponding value of the stored voltage-current profile of the initial powering phase of the powered device at the respective port.

* * * * *